United States Patent [19]

Oyama et al.

[11] Patent Number: 4,517,837
[45] Date of Patent: May 21, 1985

[54] AIR FLOW RATE MEASURING APPARATUS

[75] Inventors: Yoshishige Oyama; Teruo Yamauchi, both of Katsuta; Mamoru Fujieda, Ibaraki; Yutaka Nishimura, Katsuta; Takao Sasayama; Shinichi Sakamoto, both of Hitachi; Hisanori Moriya, Katsuta; Takeshi Atago, Katsuta; Kanemasa Sato, Katsuta; Yoshikazu Hoshi, Ibaraki; Sadayasu Ueno, Katsuta; Tadahiko Otani, Katsuta; Mineo Kashiwaya, Katsuta, all of Japan

[73] Assignee: Hitachi, Ltd., Tokyo, Japan

[21] Appl. No.: 521,901

[22] Filed: Aug. 10, 1983

Related U.S. Application Data

[63] Continuation of Ser. No. 28,889, Apr. 10, 1979, abandoned.

[30] Foreign Application Priority Data

Apr. 10, 1978 [JP] Japan .................................. 53-42547

[51] Int. Cl.³ ............................................... G01F 5/00
[52] U.S. Cl. ......................................... 73/202; 73/118
[58] Field of Search ...................... 73/118 A, 202, 204

[56] References Cited

U.S. PATENT DOCUMENTS

| Re. 24,436 | 2/1958  | Jacobson et al. | 73/204 X |
|------------|---------|-----------------|----------|
| 1,691,600  | 11/1928 | Brush et al.    | 73/204   |
| 2,580,182  | 12/1951 | Morgan et al.   | 73/204 X |
| 2,870,305  | 1/1959  | Ling            | 73/204 X |
| 3,085,431  | 4/1963  | Yerman et al.   | 73/204   |
| 3,374,673  | 3/1968  | Trageser        | 73/204   |
| 3,559,482  | 2/1971  | Baker et al.    | 73/204   |
| 3,592,055  | 7/1971  | Dorman          | 73/204 X |
| 3,747,577  | 7/1973  | Mauch           | 123/119  |
| 3,776,208  | 12/1973 | Sturapp         | 123/119  |
| 3,800,592  | 4/1974  | Jones, Jr.      | 73/204   |
| 3,824,966  | 7/1974  | Schnelder et al. |         |
| 4,074,566  | 2/1978  | Obayashi        | 73/204   |
| 4,121,549  | 10/1978 | Martin          | 123/119  |

FOREIGN PATENT DOCUMENTS

| 1109953 | 1/1962  | Fed. Rep. of Germany . |        |
|---------|---------|------------------------|--------|
| 1576451 | 12/1971 | Fed. Rep. of Germany . |        |
| 2038967 | 2/1972  | Fed. Rep. of Germany . |        |
| 2653359 | 5/1977  | Fed. Rep. of Germany . |        |
| 1098077 | 1/1968  | United Kingdom         | 73/204 |
| 1356334 | 5/1971  | United Kingdom .       |        |

OTHER PUBLICATIONS

Datametrics Bulletin 600 "Heated Sensor Finds Wide Applications in Fluid Flow Measurements", 10/70, pp. 4, FIGS. 1–3 and 7.

Primary Examiner—Herbert Goldstein
Attorney, Agent, or Firm—Antonelli, Terry & Wands

[57] ABSTRACT

An air flow rate measuring apparatus in which an air flow sensor whose electric characteristic varies with the rate of air flowing by the sensor is supported on a heat-insulating support member and located in a bypass tube provided in the vicinity of the main venturi of an internal combustion engine, whereby the air flow sensor is isolated from adverse thermal influences so as to reduce an error in measuring air flow rate.

18 Claims, 10 Drawing Figures

AIR FLOW RATE MEASURING APPARATUS

This is a continuation of application Ser. No. 028,889 filed Apr. 10, 1979, now abandoned.

BACKGROUND OF THE INVENTION

1. Field of the Invention

This invention relates to an air flow rate measuring apparatus used especially for the measurement of the flow rate of air taken into an internal combustion engine.

2. Description of the Prior Art

An example of the conventional air flow rate measuring apparatus is disclosed in, for example, the U.S. patent application No. 3,824,966, in which a thin bare wire of metal is extended across the main venturi so as to be used as a flow sensor.

Such a flow sensor is exposed directly to the adverse influence of the abnormal condition such as the back fire of engine so that the fine wire tends to be damaged by thermal and mechanical impacts due to the abnormal phenomenon. Moreover, since the sensor is placed in the main venturi where the rate of flow of the intake air is very large, microscopic dust suspended in the intake air tends to be deposited on the fine wire. The deposited dust deteriorates the characteristic of the sensor. Further, the above cited flow sensor is subject to thermal disturbance due to heat conduction through the supporting member of, for example, metal and the disturbance leads to error in the measurement of air flow.

Another example of the conventional air flow apparatus is disclosed in, for example, the Japanese Patent Laid-Open No. 113432/77. According to the cited reference, the air flow meter is located in a bypass provided apart from the main venturi. In this reference, however, no thermal influence on the air flow meter is considered.

SUMMARY OF THE INVENTION

The object of this invention is to eliminate the drawbacks of the conventional air flow rate measuring apparatus and therefore to provide an air flow rate measuring apparatus in which an air flow sensor is supported by a heat-insulating support member and located in a bypass for the main venturi of an internal combustion engine so that the error in the detected flow may be reduced.

DESCRIPTION OF THE PREFERRED EMBODIMENTS

Figure 1:
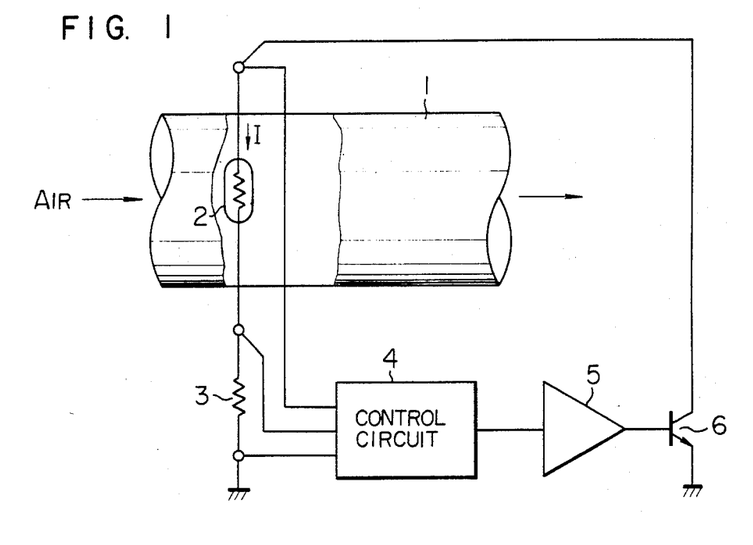
FIG. 1 illustrates the principle of a method for measuring the flow rate of air drawn into an engine.

As shown in FIG. 1, in a path 1 in which intake air flows, an air flow sensor 2 whose electric characteristic varies with the flow rate or the velocity of the intake air is provided. The air flow sensor 2 is grounded through a resistor 3 and the sensor 2 and the resistor 3 form two arms of a resistance bridge circuit. The voltage developed across the resistor 3 is applied to a control circuit 4. The output of the control circuit 4 is amplified by an amplifier 5 and then used to control a power transistor 6. One terminal of the air flow sensor 2 is connected with the collector of the power transistor 6. With the circuit shown in FIG. 1, the current I flowing through the air flow sensor 2 is picked up by the resistor 3. Also, the current I is so controlled by the control circuit 4 and the transistor 6 so as to maintain the temperature and therefore, the resistance of the sensor 2 constant. Accordingly, the current I is related to the air flow rate Q by King's formula such that $I^2 = (C_1 + C_2\sqrt{Q})(t_w - t_a)S$; therefore, the flow rate Q of air flowing by the sensor 2 can be measured by detecting the current I, where $C_1$, $C_2$, and S are coefficients, $t_w$ the temperature of hot wire, and $t_a$ the temperature of air. This way of detecting the air flow rate is based on the temperature-fixed control of the sensor 2 in which the temperature of the sensor 2 is kept constant throughout the measurement. Alternatively, however, the so-called current-fixed control type air flow rate measurement may be employed. The temperature-fixed control is quicker in response than the current-fixed control.

Figure 2:
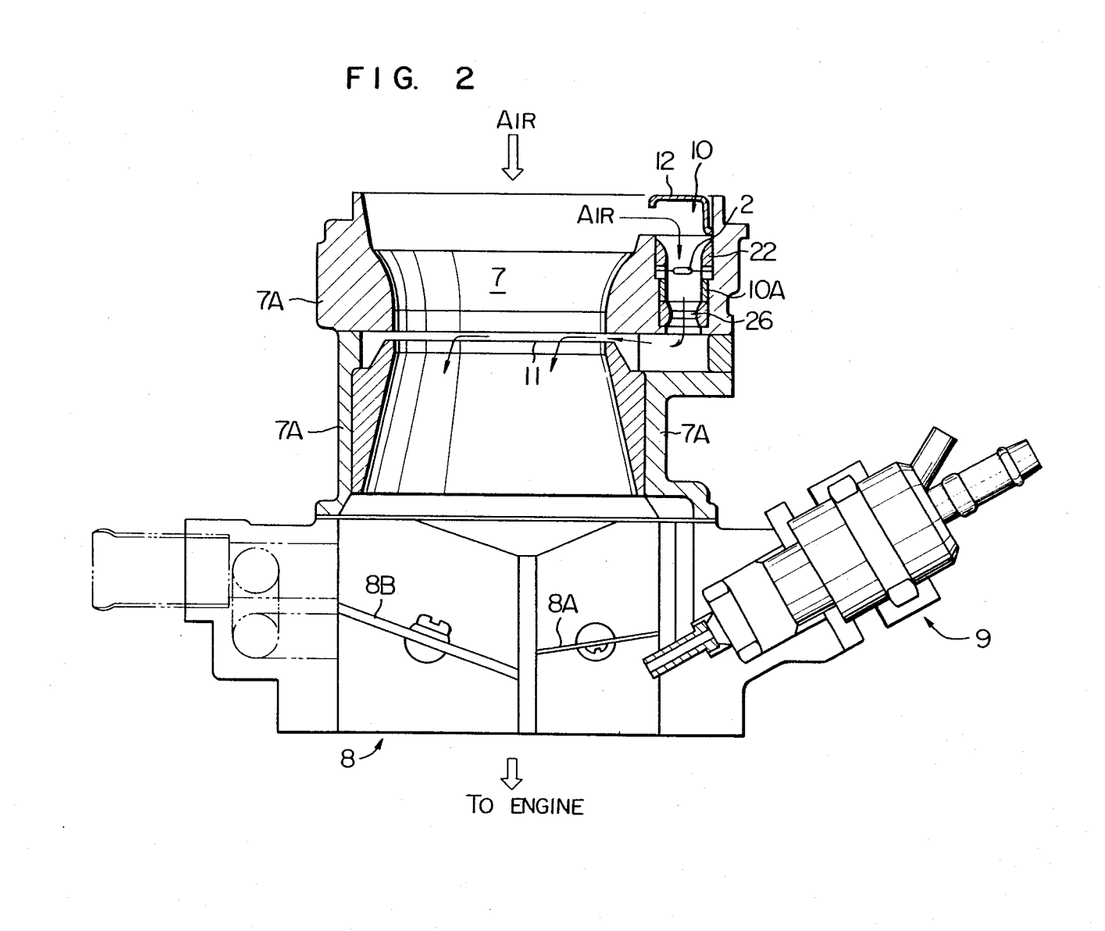
FIG. 2 shows in partially sectioned view an embodiment of this invention.

As shown in FIG. 2, a main venturi 7 is connected with a throttle chamber 8 provided with a primary and a secondary throttle valves 8A and 8B. In the throttle chamber generally designated by the reference numeral 8, a fuel injector generally designated by the reference numeral 9 injects fuel on the downstream side of the primary throttle valve 8A. The air flows into an air suction path which includes a main venturi chamber 7A and a throttle chamber 8. The air suction path is divided into a main air suction path and a bypass path 10. The air flowing into the main venturi 7 is supplied from an air filter (not shown) provided on the upstream side of the main venturi 7 and the air-fuel mixture produced by the injection of fuel is sent through the throttle valves 8A and 8B to the cylinders of the engine. A part of the air flowing toward the constricted throat of the main venturi is caused to flow into a bypass 10 as indicated by arrows in FIG. 2. The bypass 10 is formed in the venturi chamber body 7A defining the main venturi 7. The air flow past the bypass 7 exits into the main venturi 7 through a circular slit 11 cut in the inner wall of the venturi 7 since there is a difference in pressure between the entrance of the bypass 10 and the slit 11.

Figure 3:
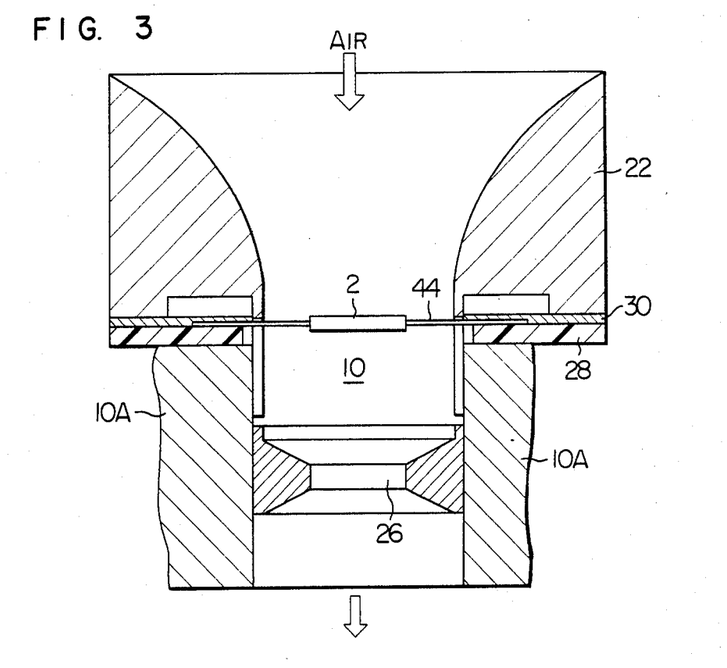
FIG. 3 shows, on an enlarged scale, a principal portion of the structure shown in FIG. 2.
Figure 4:
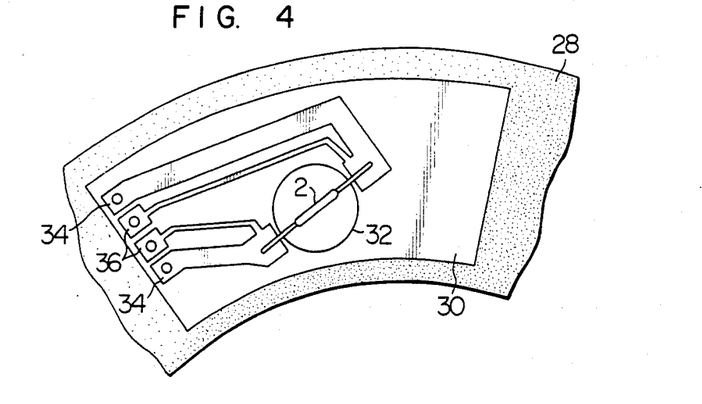
FIG. 4 shows in top view the flow sensor and the associated heat-insulating support member shown in FIGS. 2 and 3.

As shown in FIGS. 3 and 4, an air flow guide member 22, made of metal or insulating material, is placed on the upstream side of the sensor 2 so as to make the air flow uniform. It is preferable that the opening in the air flow guide member 22 should have a circular cross section.

Therefore, the bypass 10 should also preferably have a circular cross section. An orifice 26 is provided to render the ratio of the rate of the flow of air through the bypass 10 to the rate of the flow of air through the main venturi 7 set at a predetermined value (the ratio is referred to as bypass ratio). A dust cover 12 (see FIG. 2) has an area larger than the topmost cross sectional area of the opening of the air flow guide member 22 so that dust suspended in the intake air may not enter the bypass 10. The air flow sensor 2 is rigidly fixed to a support plate 30 made of heat-insulating material in a manner described in detail hereinbelow. As shown in FIG. 3, the support plate 30 is clamped between the air flow guide member 22 and a gasket 28, preferably made of a heat-insulating and vibration absorbing material, and the guide member 22 is rigidly fixed to the bypass chamber body 10A defining the bypass 10 by means of, for example, screws (not shown). The support plate 30 may be made of ceramic or epoxy resin.

The heat-insulating support plate 30 has an opening 32 almost the same in size as the opening of the guide member 22, as shown in FIG. 4, and the sensor 2 is located in the central region of the opening 32. Electrodes 34 for supplying electric power to the sensor 2 and electrodes 36 for detecting the voltage across the sensor 2 are provided on the support plate 30 by a well-known technique such as, for example, printed-circuit formation. The ends of the lead wires of the sensor 2 are connected with the electrodes 36 by soldering or according to a method as described hereinbelow.

The temperature of the air flowing through the bypass 10 varies depending on, for example, the weather, the sensors, and the operating condition of the engine, and the variation in the temperature will cause an error in the measurement of the rate of air flow through the bypass with the air flow sensor. It is therefore necessary to measure the temperature of the air flowing through the bypass 10 and to correct the data obtained from the sensor 2 by the use of the result of the temperature measurement. Accordingly, a temperature sensor 31 is employed for this purpose, which should be of the same structure as the air flow sensor 2 in view of fabrication and performance or may be an ordinary thermister.

Figure 5:
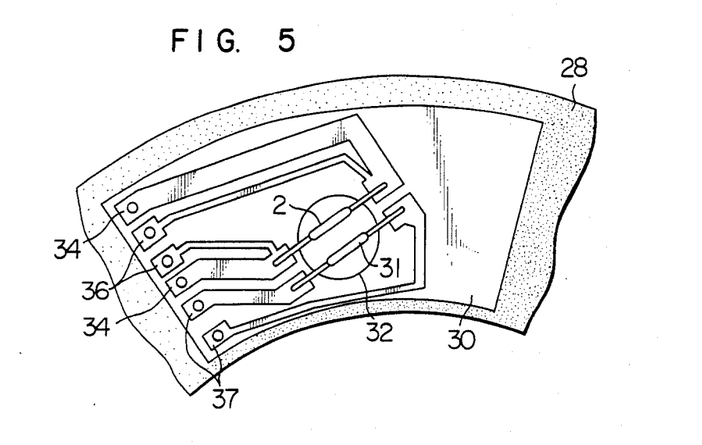
FIG. 5 shows in top view another embodiment of this invention in which the construction shown in FIG. 3 or 4 is provided with a temperature sensor.

FIG. 5 shows another embodiment of this invention in which an air flow sensor 2 and an air temperature sensor 31 are juxtaposed substantially in a plane. The temperature sensor 31 is connected with electrodes 37 attached to a heat-insulating support plate 30.

Figure 6:
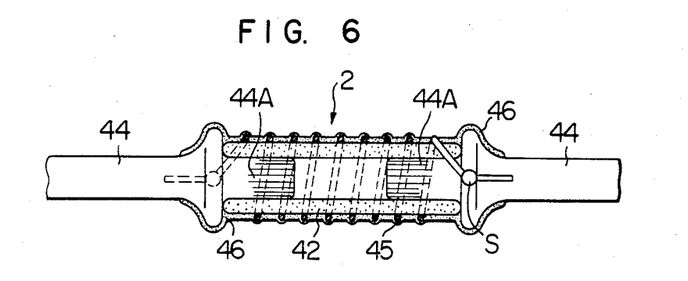
FIG. 6 shows in partially sectioned view the detailed structure of a flow sensor used in an air flow rate measuring apparatus according to this invention.

FIG. 6 shows in detail the structure of the air flow sensor 2 used in the embodiments of this invention. A cylindrical base 42 is hollow and made of, for example, glass or ceramic. Each of lead wires 44 is made of, for example, a paltinum-iridium alloy or so-called Dumet wire. The lead wire 44 has a portion 44A with a diameter slightly smaller than that of the cylindrical base 42 and also a flange-like portion having a diameter larger than that of the cylindrical base 42. The portion 44A having a smaller diameter is fitted into the hollow of the cylindrical base 42 and the lead wire 44 and the base 42 with it surface metallized are rigidly bound together by, for example, soldering (for ceramic base) or thermal fusion (for glass base). Turns of thin resistive wire 45 made of, for example, platinum, a nickel-chromium alloy or a tyngsten-silver alloy, are wound about the cylindrical surface of the base 42 and each of the ends of the wire 45 is connected with the lead wire 44 at a point S by means of, for example, spot welding. Preferably, the surface including those of the base 42, the resistive wire 45 and a part of the lead wire 44 should be covered with an inorganic insulating material such as, for example, glass having resistivity to heat, moisture and oxidation. It is necessary that the lead wire 44 and the cylindrical base 42 should have almost the same thermal expansion coefficient. This is because the portion of the cylindrical base 42 kept in contact with the lead wire 44 must be protected against too great thermal stress which results from repeated variations of temperature due to repeated use of the engine and which may cause damage to the sensor 2.

Figure 7:
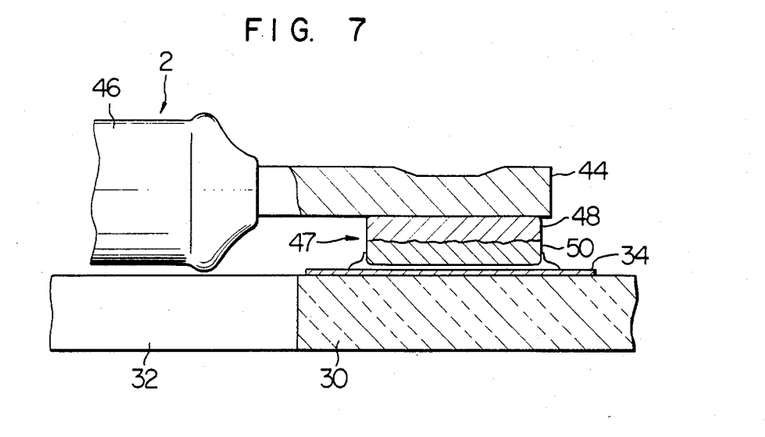
FIG. 7 shows in partially sectioned view how a flow sensor embodying this invention may be mounted on a heat-insulating support member.

FIG. 7 shows another embodiment of this invention in which the lead wires 44 of the sensor 2 are fixed to the heat-insulating support plate 30 in such a manner as described below. A so-called pressure-welded composite metal plate 47 is formed by the pressure welding of two metals, with an upper metal sheet 48 being made of, for example, platinum, tungsten or stainless steel and lower metal sheet 50 being made of, for example, copper, copper alloy or nickel-plated iron. The lead wire 44 is connected with the pressure-welded composite metal plate 47 by, for example, spot welding. The composite metal plate 47 and especially the lower metal sheet 50 is rigidly fixed to the electrode 34 or 37 of copper or nickel-plated aluminum by, for example, soldering. Dumet wire may be substituted for the composite metal plate 47 and in that case the Dumet wire is connected with the lead wire by spot welding while the dumet wire is soldered to the electrode 34.

Figure 8A:
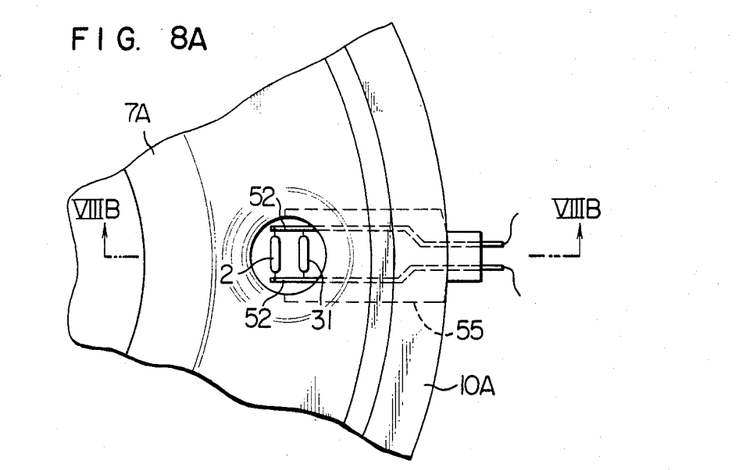
FIG. 8A shows the structure of a heat-insulating support member as another embodiment of this invention.
Figure 8B:
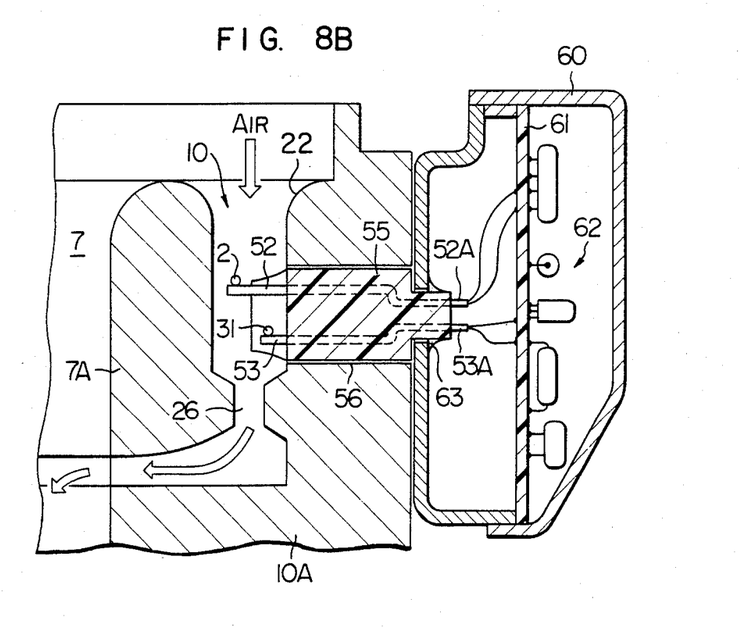
FIG. 8B is a cross section taken along line VIIIB—VIIIB in FIG. 8A, with the cross section of a housing for containing the associated control circuit therein.

In the embodiments shown in FIGS. 3, 4 and 5, the sensor 2 is fixed to a heat-insulating member in the form of a flat plate, but in the embodiment of FIGS. 8A, 8B, the sensor 2 is rigidly mounted on a heat-insulating support member 55 in the form of a block. The block-shaped support member 55 is inserted through the side wall of the bypass chamber body 10A into the bypass 10 so that the sensor 2 may be located in position in the bypass 10.

Conductors 52 and 53 with which the air flow sensor 2 and the temperature sensor 31 are connected respectively are embedded in the cylindrical heat-insulating support member 55. The ends of the conductors 52 and 53 protrude from the surface of the support member 55 so as to serve as wiring terminals 52A and 53A. A housing 60 contains a printed circuit board 61 and the parts 62 of a control circuit soldered to the board 61. The terminals 52A and 53A are connected with the control circuit 62 for operating and controlling the air flow sensor 2 and the temperature sensor 31. The housing 60 has its inner portion rigidly fixed to the portion of the support member 55 projecting from the bypass chamber body 10A by, for example, a binding agent 63. The housing 60 is, in turn, fixed to the bypass chamber body 10A by means of, for example, screws (not shown). The support member 55 is fitted into a bore 56 communicating with the bypass 10.

With this structure, the housing 60 containing the control circuit 62 and the support member 55 form an integral unit which may be attached to or detached from the bypass chamber body 10A.

Figure 9:
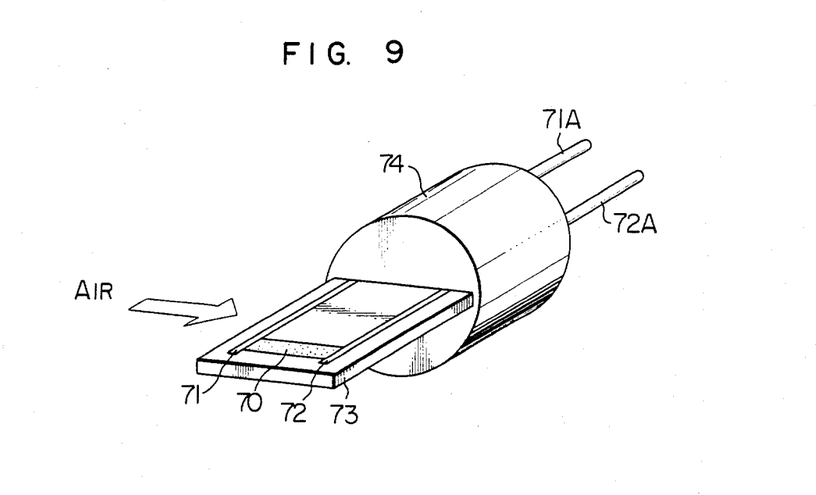
FIG. 9 shows in oblique view a flow sensor as another embodiment of this invention.

As shown in FIG. 9, an air flow sensor may be fabricated by sintering a film of paste composed mainly of platinum or silver. Such a sensor is a so-called planar thick film thermistor. The sensor 70 is formed on a base plate 73 of ceramic or glass and the ends of the sensor 70 and electrically connected with conductors 71 and 72. A heat-insulating support member is made of, for example, ceramic or suitable synthetic resin. It is preferable to form the base 73 and the support member 74 as a single unit. The conductors 71 and 72 are embedded in the support member 74 and connected respectively with external terminals 71A and 72A. A broad arrow indicates the direction of the air flow. The support member 74 having the air flow sensor 70 mounted thereon may be inserted through the through hole 56 cut in the bypass chamber body 10A into the bypass 10, as shown in FIG. 8B, so that the air flow sensor 70 is located in the center of the bypass 10.

As described above, according to this invention, since the air flow sensor 2 is supported on the heat-insulating support member, the sensor 2 is free from the thermal disturbance such as the conductive dissipation of the heat generated by the sensor itself and the conductive addition of heat from the bypass chamber body 10A or the venturi chamber body 7A to the sensor 2. As a result, the sensor 2 can perform measurements with only small errors. Moreover, since the sensor 2 is placed in the bypass 10, the thermal and mechanical impacts due to back firing cannot reach the bypass 10. Further, since the air flow is smaller in the bypass 10 than in the main venturi 7, the sensor 2 can be well protected from the adverse effect by dust so that a high precision in detection can be preserved.

Incidentally, if the venturi chamber body 7A is spaced from the throttle chamber 8 by a spacer interposed therebetween, the thermal influence on the sensor 2, which may be otherwise considerable, can be effectively reduced.

We claim:

1. An air flow rate measuring apparatus comprising a venturi chamber body for defining a main venturi; a bypass chamber body for defining a bypass near said venturi chamber body, said bypass allowing an air flow rate having a predetermined ratio with respect to a rate of an air flow through said main venturi; an air flow sensor whose electric characteristic varies with the rate of air flow passing by; an electric circuit for operating and controlling said air flow sensor; a heat insulating support member for supporting said air flow sensor thereon, said support member is so fixed to said bypass chamber body that said air flow sensor may be located in said bypass, said support member is a flat plate having an opening of an area which is substantially the same as the cross sectional area of said bypass and said air flow sensor is connected with a pair of electrodes provided on said support member in such a manner that said sensor is located within said opening, said air flow sensor comprises a resistive wire wound spirally around a cylindrical support member of heat resistive inorganic material and lead wires of metal connected to said resistive wire, a free end of each of said metal lead wires is spot welded to one main surface of a small piece of pressure welded composite metal plate and the other main surface of said piece of pressure welded composite metal plate is soldered to one of said electrodes.

2. An apparatus as claimed in claim 1, wherein the free end of each of said metal lead wire is spot-welded to a dumet wire and said dumet wire is in turn soldered to one of said electrodes.

3. An air flow rate measuring apparatus comprising a venturi chamber body for defining a main venturi; a bypass chamber body for defining a bypass near said venturi chamber body, said bypass allowing an air flow rate having a predetermined ratio with respect to a rate of an air flow through said main venturi; an air flow sensor whose electric characteristic varies with the rate of air flow passing by; an electric circuit for opening and controlling said air flow sensor; a heat insulating support member for supporting said air flow sensor thereon, said support member is so fixed to said bypass chamber body that said air flow sensor may be located in said bypass, said heat insulating support member is in the shape of a block, an opening for receiving said block-shaped support member therein is cut in the side wall of said bypass chamber body, said air flow sensor is located in said bypass by fitting said support member in said opening, said support member is further provided with a pair of electrodes, said air flow sensor comprises a resistive wire wound spirally around a cylindrical support member of heat resistive inorganic material and lead wires of metal connected with said resistive wire, said lead wires are connected with said pair of electrodes, a free end of each of said lead wires spot welded to one main surface of a small piece of pressure welded composite metal plate and the other main surface of said piece of pressure welded composite metal plate is soldered to one of said electrodes.

4. An apparatus as claimed in claim 3, wherein the free end of each of said lead wires is spot-welded to a dumet wire and said dumet wire is in turn soldered to one of said electrodes.

5. An air flow rate measuring apparatus for an internal combustion engine, the air flow rate measuring apparatus comprising a venturi chamber body defining a main venturi at an upstream position of a throttle valve disposed in an air suction path of the internal combustion engine, the air suction path including a main air suction path and a bypass path, the bypass path is spaced from the main air suction path and provided at a portion of said venturi chamber body for passing an air flow with a constant ratio with regard to an air flow passing into said main venturi and an outlet of said bypass path is formed in a portion of said main venturi, guide means disposed in the bypass path including a first substantially curved guide portion for uniformly distributing the air flow and a second substantially straight guide portion disposed downstream of said first guide portion for increasing the flow rate of the air passing in the bypass path, an air flow detecting means mounted within said bypass path in the second substantially straight guide portion of said bypass path and including a temperature dependent resistor disposed in a direction perpendicular to the air flow traversing the bypass path, and means for supplying an electric current to said temperature-dependent resistor, whereby a heat quantity emitted from said resistor is changed by said supplying means in such a manner that a heat quantity transmitted from said temperature-dependent resistor to surrounding air is compensated thereby making the temperature of the temperature-dependent resistor constant with respect to the air flow in order to enable a measuring of an air flow rate in accordance with an amount of current flowing into the temperature-dependent resistor.

6. An air flow rate measuring apparatus according to claim 5, wherein said temperature-dependent resistor is disposed on a surface of a cylindrical means composed of one of a ceramic and glass material.

7. An air flow rate measuring apparatus according to claim 6, wherein an inlet of said bypass path is formed in the air suction path located between said main venturi and an air cleaner and is disposed in an upstream portion of said main venturi.

8. An air flow rate measuring apparatus according to claim 5, wherein said air flow detecting means is supported on a support member fashioned of an adiabatic material fixed to said venturi chamber body.

9. An air flow rate measuring apparatus as claimed in claim 8, wherein said support member is fashioned as a flat plate having an opening therein, an area of the flat plate is substantially the same as the cross-sectional area of said bypass path, and said air flow detecting means is connected with a pair of electrodes provided on said support member in such a manner that said detecting means is located within said opening.

10. An air flow rate measuring apparatus as claimed in claim 9, wherein a temperature sensor means is provided for detecting a temperature of the air flowing through said bypass path, and said temperature sensor means is connected with the electrodes provided on the support member and juxtaposed with said air flow detecting means within said opening.

11. An air flow rate measuring apparatus as claimed in claim 5, wherein said support member is in the shape of a block, an opening for receiving said block-shaped support member therein is cut in a side wall of said bypass path, and said air flow detecting means is located in said bypass path by fitting said support member in said opening.

12. An air flow rate measuring apparatus as claimed in claim 11, wherein a temperature sensor means is further provided for detecting a temperature of the air flowing through said bypass path, and said temperature sensor means is supported on said support member.

13. An air flow measuring apparatus as claimed in claim 11, further comprising a control circuit means, a housing means for accommodating said control circuit means, a portion of said block-shaped support member extending out of the side wall of said bypass chamber body is fixed to a portion of a side surface of the housing means resting on a side wall of said bypass chamber body when said housing means is attached to said bypass chamber body.

14. An air flow rate measuring apparatus as claimed in claim 11, wherein said support member is further provided with a pair of electrodes, said air flow detecting means includes a planar thick film thermistor, and said planar thick film thermistor is connected with said pair of electrodes.

15. An air flow rate measuring apparatus for an internal combusion engine, the air flow rate measuring apparatus comprising a venturi chamber body defining a main venturi at an upstream position of a throttle valve disposed in an air suction path of the internal combustion engine, a bypass path provided at a portion of said venturi chamber body for passing an air flow with a constant ratio with regard to an air flow passing into said main venturi and an outlet of said bypass path is formed in said main venturi, and an air flow detecting means mounted within said bypass path and including a temperature-dependent resistor disposed in a direction perpendicular to the air flow traversing the bypass path, said temperature-dependent resistor comprising a resistive wire wound spirally about a cylindrical support member of a heat-resistive inorganic material, and the metallic lead wires connected with said resistive wire, a free end of each of said metal lead wires is spot welded to a composite connecting material soldered to an electrode said measuring apparatus further comprising guide means disposed in the bypass path upstream of said air flow detecting means for uniformly distributing the air flow in the bypass path and means for supplying an electric current to said temperature-dependent resistor, whereby a heat quantity emitted from said resistor is changed by said supply means in such a manner that a heat quantity transmitted from said temperature-dependent resistor to surrounding air is compensated thereby making the temperature of said temperature-dependent resistor constant without regard to the air flow in order to enable a measuring of the air flow rate in accordance with an amount of current flowing into the temperature-dependent resistor, and wherein said temperature-dependent resistor is disposed on a surface of a cylindrical means composed of one of a ceramic and glass material.

16. An air flow rate measuring apparatus for an internal combustion engine, the air flow rate measuring apparatus comprising a venturi chamber body defining a main venturi at an upstream position of a throttle valve disposed in an air suction path of the internal combustion engine, a bypass path provided at a portion of said venturi chamber body for passing an air flow with a constant ratio with regard to an air flow passing into said main venturi and an outlet of said bypass path is formed in said main venturi, an air flow detecting means mounted within said bypass path and including a temperature-dependent resistor disposed in a direction perpendicular to the air flow traversing the bypass path, guide means disposed in the bypass path upstream of said air flow detecting means for uniformly distributing the air flow in the bypass path, and means for supplying an electric current to said temperature-dependent resistor, whereby a heat quantity emitted from said resistor is changed by said supplying means in such a manner that a heat quantity transmitted from said temperature-dependent resistor to surrounding air is compensated thereby making the temperature of said temperature-dependent resistor constant with regard to the air flow in order to enable a measuring of the air flow rate in accordance with an amount of current flowing into the temperature-dependent resistor, said air flow detecting means is supported on a support member fashioned of an adiabatic material fixed to said venturi chamber body and provided with a pair of electrodes, said air flow detecting means comprises a resistive wire wound spirally about a cylinderical support member of a heat-resistive inorganic material, and metallic lead wires connected with said resistive wire, and wherein said lead wires are connected with said pair of electrodes.

17. An air flow rate measuring apparatus as claimed in claim 16, wherein a free end of each of said lead wires is spot welded to a Dumet wire, and said Dumet wire is soldered to one of said electrodes.

18. An air flow rate measuring apparatus for an internal combustion engine, the air flow rate measuring apparatus comprising:
a venturi means disposed upstream of a throttle valve arranged in an intake line of the internal combustion engine, a bypass means for allowing an air flow therethrough, said bypass means being spaced from said venturi means and having disposed therein an electrical flow sensor means for sensing flow rate in an air flow including a temperature-dependent resistor means for sensing a heat transfer between the resistor means and the air thereby enabling a measuring of the air flow rate, an inlet of said bypass means is disposed in a full non-restricted cross section of said venturi tube, said bypass means terminates through an opening into the region of said venturi means, a ratio of flow rate through said bypass means to a flow rate through said venturi means is set at a predetermined value, guide means disposed in the bypass means including a first substantially curved guide portion for uniformly distributing the air flow and a second substantially straight guide portion for increasing the flow rate of air passing in the bypass means, and a support member fixedly clamped in said second substantially straight guide portion of said bypass means for mounting the flow sensor means in the bypass means.

* * * * *